US010099375B2

(12) United States Patent
Shi et al.

(10) Patent No.: US 10,099,375 B2
(45) Date of Patent: Oct. 16, 2018

(54) COMPONENT ASSEMBLY SYSTEM AND METHOD OF ASSEMBLING A COMPONENT

(71) Applicant: GM GLOBAL TECHNOLOGY OPERATIONS LLC, Detroit, MI (US)

(72) Inventors: Jianying Shi, Oakland Township, MI (US); Scott A. McLeod, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 14/830,314

(22) Filed: Aug. 19, 2015

(65) Prior Publication Data
US 2017/0050277 A1 Feb. 23, 2017

(51) Int. Cl.
*B25J 9/00* (2006.01)
*B25J 15/00* (2006.01)
(Continued)

(52) U.S. Cl.
CPC .............. *B25J 9/1687* (2013.01); *B23K 9/16* (2013.01); *B23K 9/32* (2013.01); *B23K 37/02* (2013.01); *B23K 37/0443* (2013.01); *B23P 21/00* (2013.01); *B25J 9/0084* (2013.01); *B25J 9/1682* (2013.01); *B25J 15/0061* (2013.01); *B62D 65/026* (2013.01); *B62D 65/18* (2013.01); *B23K 2201/006* (2013.01); *B23K 2201/18* (2013.01);
(Continued)

(58) Field of Classification Search
CPC .... B25J 9/0084; B25J 9/1687; B25J 15/0061; B62D 65/026; B62D 65/18; B62D 65/024; Y10T 29/49829; Y10T 29/53961; Y10T 29/53435; B23K 9/16; B23P 21/00
USPC ........................ 269/55, 266; 29/430; 700/248
See application file for complete search history.

(56) References Cited

U.S. PATENT DOCUMENTS 4,691,905 A * 9/1987 Tamura ................ B23K 37/047
269/266
6,250,619 B1 * 6/2001 Cook ...................... B23Q 1/035
269/20

(Continued)

FOREIGN PATENT DOCUMENTS

CN 101269466 A 9/2008
DE 102004049332 * 4/2006
(Continued)

*Primary Examiner* — Christopher M Koehler
*Assistant Examiner* — Mahdi H Nejad
(74) *Attorney, Agent, or Firm* — Quinn IP Law

(57) ABSTRACT

A method of assembling a component includes gripping a first subcomponent with a first end-of-arm tool and grasping a second subcomponent with a second end-of-arm tool. The first tool is attached to a first robot arm and the first subcomponent defines a first plurality of locating holes. The second tool is attached to a second robot arm and the second subcomponent defines a second plurality of locating holes. After grasping, the method includes aligning at least one of the first locating holes adjacent to at least one of the second locating holes to set an initial position of the second subcomponent with respect to the first subcomponent without releasing the first and second subcomponents. After aligning, the method includes forming a joint between the first and second subcomponents with a joining tool attached to a joining robot arm to thereby assemble the component. A component assembly system is also disclosed.

12 Claims, 5 Drawing Sheets

(51) Int. Cl.
*B25J 9/16* (2006.01)
*B62D 65/02* (2006.01)
*B62D 65/18* (2006.01)
*B23K 9/16* (2006.01)
*B23K 9/32* (2006.01)
*B23K 37/02* (2006.01)
*B23K 37/04* (2006.01)
*B23P 21/00* (2006.01)
*B23K 101/00* (2006.01)
*B23K 101/18* (2006.01)

(52) U.S. Cl.
CPC ....... *B23P 2700/01* (2013.01); *B23P 2700/50* (2013.01); *G05B 2219/39129* (2013.01); *G05B 2219/40032* (2013.01); *Y10T 29/49829* (2015.01)

(56) References Cited

U.S. PATENT DOCUMENTS

| | | | |
|---|---|---|---|
| 6,687,971 B2* | 2/2004 | Nakamura | B62D 65/02 29/281.1 |
| 6,954,980 B2* | 10/2005 | Song | B62D 65/06 29/281.1 |
| 7,204,481 B2* | 4/2007 | Sears | B23K 11/11 269/266 |
| 8,523,156 B2* | 9/2013 | Hou | B25B 5/10 269/165 |
| 2008/0172857 A1* | 7/2008 | Brinkworth | B25J 9/0084 29/559 |
| 2011/0160905 A1* | 6/2011 | Asamizu | B25J 15/0019 700/258 |
| 2013/0082169 A1* | 4/2013 | Kilibarda | B62D 65/026 250/222.1 |
| 2017/0050322 A1* | 2/2017 | Shi | B25J 15/009 |
| 2017/0050323 A1* | 2/2017 | Shi | B25J 15/0047 |

FOREIGN PATENT DOCUMENTS

| | | |
|---|---|---|
| EP | 2965834 A2 * | 5/2014 |
| EP | 2824526 A2 * | 1/2015 |
| JP | H10264068 A | 10/1998 |

\* cited by examiner

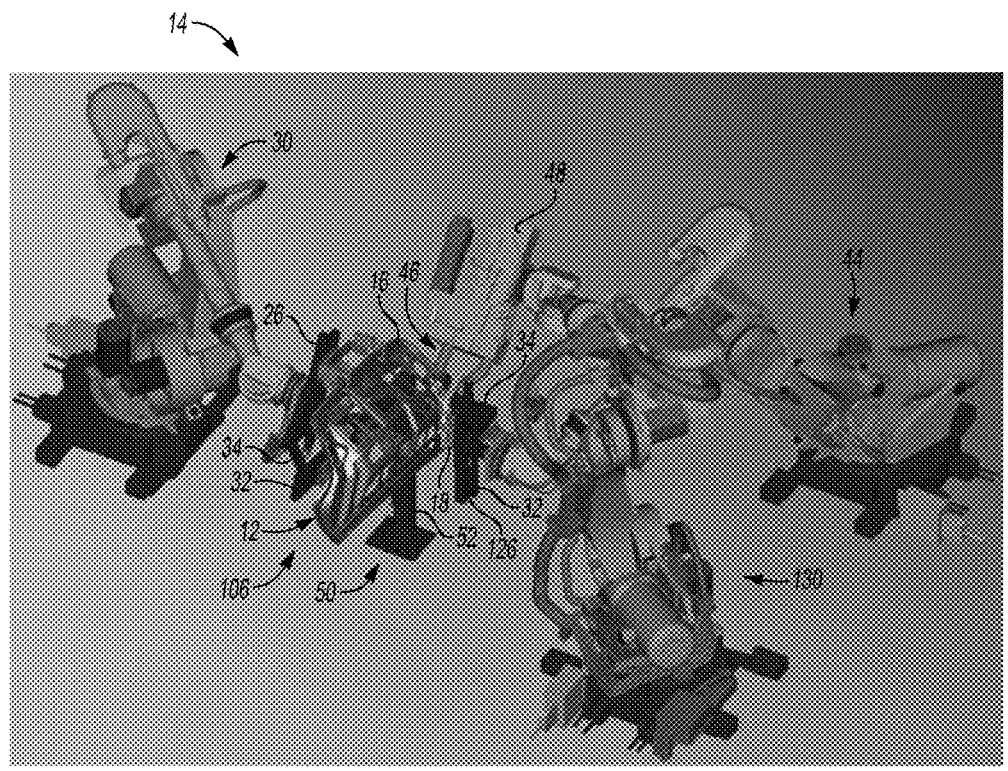

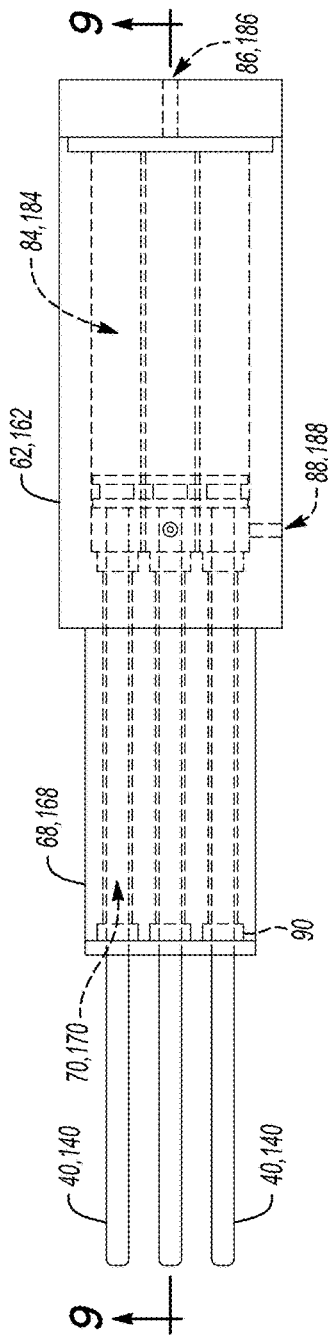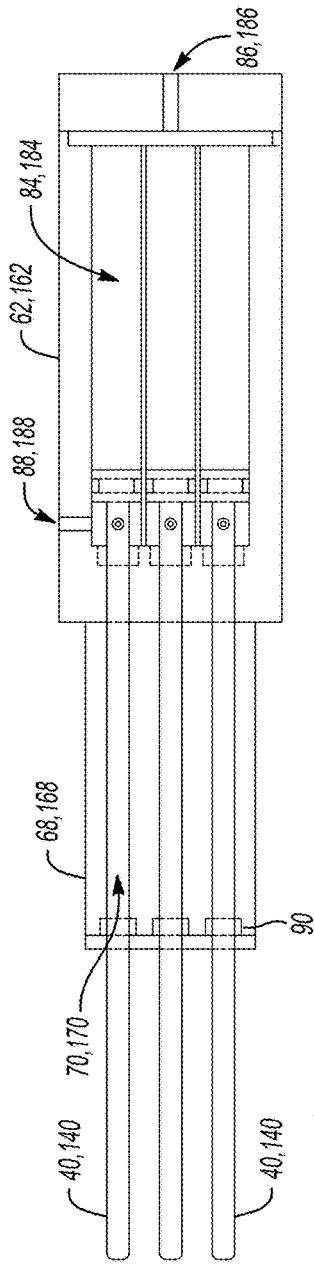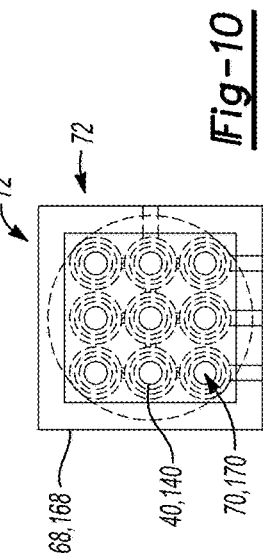

COMPONENT ASSEMBLY SYSTEM AND METHOD OF ASSEMBLING A COMPONENT

TECHNICAL FIELD

The disclosure relates to a component assembly system and to a method of assembling a component.

BACKGROUND

A manufacturing system typically moves, transforms, or operates on parts, subassemblies, and/or assemblies that must be accurately located and held in place for manufacturing and assembly operations. For example, a sheet metal part, subassembly, or assembly may need to be accurately located and held in place to conduct assembly, welding, and inspection operations in a body shop of a vehicle assembly plant or along an assembly line for items such as appliances, aircraft, furniture, and electronics.

Part locating fixtures are normally used for this purpose. Part locating fixtures typically include a plurality of fixed pins that are configured to fit into a plurality of locating holes defined by a part, and one or more clamps that are configured to hold the part in place. Part locating fixtures are generally useable for only one particular part size and/or shape and usually need to be modified or rebuilt to locate and hold a differently sized and/or shaped part. Multiple part locating fixtures are typically required for the wide variety of parts and the wide variety of assembly and manufacturing operations in a manufacturing plant.

SUMMARY

A method of assembling a component includes gripping a first subcomponent with a first end-of-arm tool. The first end-of-arm tool is attached to a first robot arm and the first subcomponent defines a first plurality of locating holes. The method also includes grasping a second subcomponent with a second end-of-arm tool. The second end-of-arm tool is attached to a second robot arm and the second subcomponent defines a second plurality of locating holes. After grasping, the method further includes aligning at least one of the first plurality of locating holes adjacent to at least one of the second plurality of locating holes to thereby set an initial position of the second subcomponent relative to the first subcomponent without releasing the first subcomponent from the first end-of-arm tool and without releasing the second subcomponent from the second end-of-arm tool. After aligning, the method includes forming a joint between the first subcomponent and the second subcomponent with a joining tool attached to a joining robot arm to thereby assemble the component.

A component assembly system includes a first robot arm, a first subcomponent defining a first plurality of locating holes, and a first end-of-arm tool attached to the first robot arm and configured for gripping the first subcomponent. The component assembly system also includes a second robot arm translatable towards the first robot arm, a second subcomponent defining a second plurality of locating holes, and a second end-of-arm tool attached to the second robot arm and configured for grasping the second subcomponent. The second robot arm is configured for aligning the first plurality of locating holes adjacent to the second plurality of locating holes to thereby set an initial position of the second subcomponent relative to the first subcomponent without releasing the second subcomponent from the second end-of-arm tool. The first robot arm is configured for aligning the first plurality of locating holes adjacent to the second plurality of locating holes to thereby set the initial position without releasing the first subcomponent from the first end-of-arm tool. The component assembly system also includes a joining robot arm configured for forming a joint between the first subcomponent and the second subcomponent.

In one embodiment, the component assembly system also includes a fixture configured for supporting the first subcomponent. The fixture includes a stand spaced apart from the first robot arm and the second robot arm. The stand has a first end, a second end spaced apart from the first end, and a longitudinal axis extending between the first end and the second end. The fixture also includes a first arm attached to the stand at the first end, wherein the first arm is stationary with respect to the second end. The fixture further includes a first end effector attached to the first arm. The first end effector has a first cap defining a first plurality of channels therein, and a first plurality of pins each abutting the first surface. Each of the first plurality of pins is retractable into and translatable out of a respective one of the first plurality of channels. The fixture also includes a second arm attached to the stand between the first end and the second end. The second arm is translatable along the stand with respect to the first arm along the longitudinal axis. The fixture further includes a second end effector attached to the second arm. The second end effector has a second cap defining a second plurality of channels therein and a second plurality of pins each abutting the second surface. Each of the second plurality of pins is retractable into and translatable out of a respective one of the second plurality of channels.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 2B is a schematic illustration of a perspective view of another embodiment of the component assembly system of FIG. 2A including a fixture;

FIG. 3 is a schematic illustration of a side view of the fixture of the component assembly system of FIG. 2B;

FIG. 8 is a schematic illustration of a side view of a first end effector of the fixture of FIGS. 3-5;

FIG. 9 is a schematic illustration of a cross-sectional view of the first end effector of FIG. 8 taken along section line 9-9;

FIG. 10 is a schematic illustration of an end view of the first end effector of FIG. 8.

DETAILED DESCRIPTION

Figure 1:
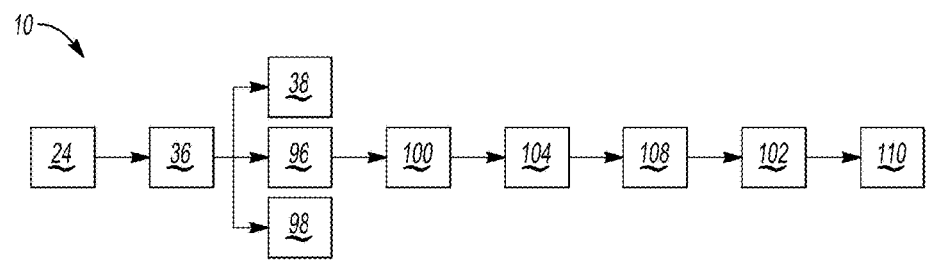
FIG. 1 is a schematic flowchart of a method of assembling a component.

Referring to the Figures, wherein like reference numerals refer to like elements, a method 10 of assembling a component 12 (FIGS. 2A and 2B) is shown generally in FIG. 1. Further, a component assembly system 14 for use with the method 10 is shown generally in FIGS. 2A and 2B. The component 12 may be formed from a first subcomponent 16 and a second subcomponent 18, and the method 10 and component assembly system 14 may be suitable for providing one-sided clamping or support for the component 12 during manufacturing operations such as welding, subassembly, assembly, picking, aligning, and the like. Therefore, the method 10 and component assembly system 14 may be suitable for manufacturing operations and environments requiring accurate part location and placement. More specifically, the method 10 and component assembly system 14 may be especially suitable for components 12 having complex shapes or contours 20, 22 (FIG. 3). For example, the method 10 and component assembly system 14 may be useful for assembly, welding, and inspection operations in a body shop of a vehicle assembly plant or along an assembly line for items such as, but not limited to, appliances, aircraft, furniture, and electronics.

The method 10 and component assembly system 14 may be useful for manufacturing operations which require handling of variously-shaped or -contoured surfaces 66, 166 (FIG. 3). Therefore, the method 10 and component assembly system 14 may be useful during part placement and/or assembly operations for, as non-limiting examples, vehicles such as automotive vehicles, construction equipment, and railcars; and consumer goods such as appliances and furniture. For example, in one non-limiting embodiment, the component 12 may be a rear decklid or liftgate of an automobile, and the method 10 and component assembly system 14 may enable flexible manufacturing processes which can accommodate variously-sized and -shaped decklids and liftgates without requiring a change in tooling. As such, the method 10 and component assembly system 14 may be especially helpful during a model changeover. That is, the component assembly system 14 may simply be electronically reprogrammed rather than physically retooled during a model changeover, and may only require modifications to software rather than modifications to hardware when a size or shape of the component 12 changes.

Figure 6:
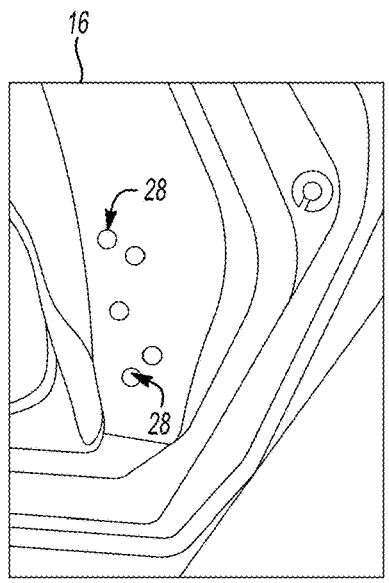
FIG. 6 is a schematic illustration of a partial, perspective view of a portion of a first subcomponent.

Referring again to FIGS. 1, 2A, and 2B, the method 10 includes gripping 24 the first subcomponent 16 (FIGS. 2A and 2B) with a first end-of-arm tool 26 (FIGS. 2A and 2B). The first subcomponent 16 may be, as a non-limiting example, a panel configured as a decklid or liftgate for an automotive vehicle. Alternatively, the first subcomponent 16 may be an aircraft fuselage panel, a door panel for a consumer appliance, an armrest for a chair, or any other subcomponent configured to be joined or attached to another subcomponent. The first subcomponent 16 may be formed from any suitable material, such as, metal, plastic, a composite, and the like. Further, as best shown in FIG. 6, the first subcomponent 16 defines a first plurality of locating holes 28.

As described with reference to FIGS. 2A and 2B, the first end-of-arm tool 26 is attached to a first robot arm 30 and may be configured for gripping 24 (FIG. 1) the first subcomponent 16, regardless of a size or shape of the first subcomponent 16. As such, the first end-of-arm tool 26 may include one or more cross-braces 32 and beams 34 that may support the first subcomponent 16 as the first robot arm 30 picks up, grips, and maneuvers the first subcomponent 16 from one position to another position. The first robot arm 30 may a programmable mechanical arm, may include hand, wrist, elbow, and shoulder portions (not shown), and may be remotely-controlled by pneumatics and/or electronics. The first robot arm 30 may be, as non-limiting examples, a six-axis articulated robot arm, a Cartesian robot arm, a spherical or polar robot arm, a selective compliance assembly robot arm, and the like. In one non-limiting example, the first robot arm 30 may be a six-axis articulated robot arm. Gripping 24 may therefore include pinching the first subcomponent 16 between two or more clamps (not shown) while translating or manipulating the first subcomponent 16.

Figure 2A:
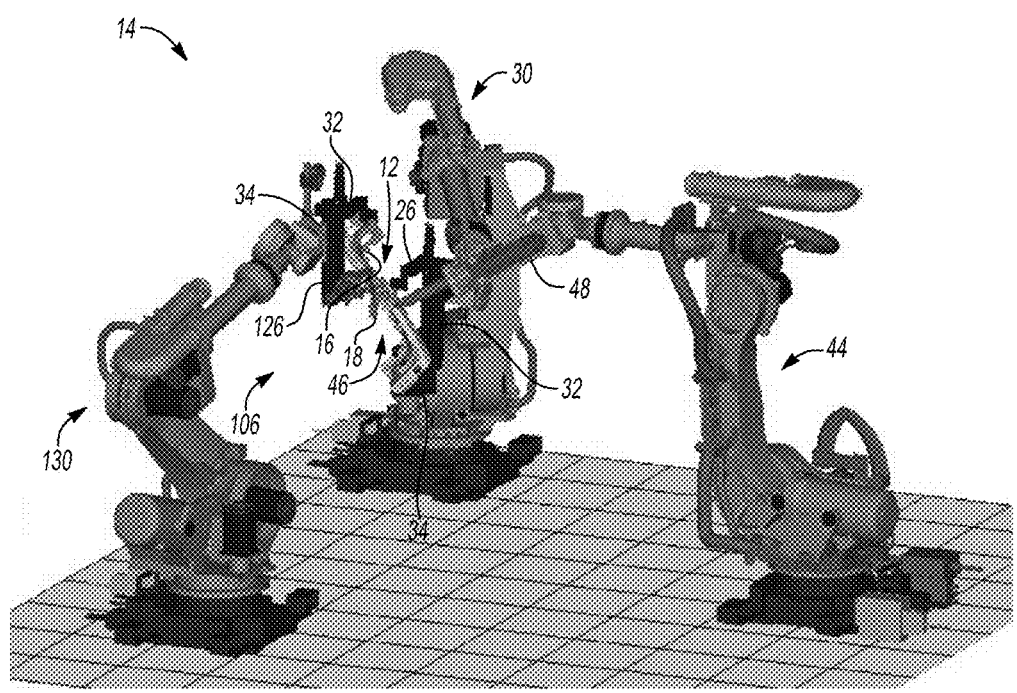
FIG. 2A is a schematic illustration of a perspective view of a component assembly system for the method of FIG. 1 including a first robot arm, a second robot arm, and a joining robot arm.
Figure 7:
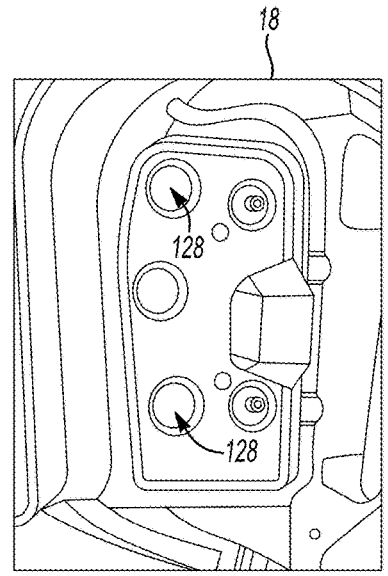
FIG. 7 is a schematic illustration of a partial, perspective view of a portion of a second subcomponent joinable with the first component of FIG. 6.

Referring now to FIG. 3, the method 10 also includes grasping 36 (FIG. 1) the second subcomponent 18 with a second end-of-arm tool 126 (FIGS. 2A and 2B). The second subcomponent 18 may be, as a non-limiting example, a reinforcement part configured for reinforcing and strengthening the first subcomponent 16. Alternatively, the second subcomponent 18 may be a second panel, an attachment device, or any other subcomponent configured to be joined or attached to the first subcomponent 16. The second subcomponent 18 may be formed from any suitable material, and may be formed from the same material or a different material than the first subcomponent 16, such as, but not limited to, metal, plastic, a composite, and the like. Further, as best shown in FIG. 7, the second subcomponent 18 defines a second plurality of locating holes 128 that are configured for alignment with the first plurality of locating holes 28, as set forth in more detail below.

Referring again to FIGS. 2A and 2B, the second end-of-arm tool 126 is attached to a second robot arm 130 and may be configured for grasping 36 (FIG. 1) the second subcomponent 18, regardless of a size or shape of the second subcomponent 18. As such, the second end-of-arm tool 126 may include one or more cross-braces 32 and beams 34 that may support the second subcomponent 18 as the second robot arm 130 picks up, grasps, and maneuvers the second subcomponent 18 from one position to another position. The second robot arm 130 may be a programmable mechanical arm, may include hand, wrist, elbow, and shoulder portions (not shown), and may be remotely-controlled by pneumatics and/or electronics. The second robot arm 130 may be, as non-limiting examples, a six-axis articulated robot arm, a Cartesian robot arm, a spherical or polar robot arm, a selective compliance assembly robot arm, and the like. Further, the second robot arm 130 may be the same or different from the first robot arm 30. In one non-limiting example, the second robot arm 130 may be a six-axis articulated robot arm. Grasping 36 may therefore include pinching the second subcomponent 18 between two or more clamps (not shown) while translating or manipulating the second subcomponent 18.

Therefore, as shown in FIGS. 2A and 2B, the component assembly system 14 includes the first robot arm 30, the first subcomponent 16 defining the first plurality of locating holes 28 (FIG. 6), and the first end-of-arm tool 26 attached to the first robot arm 30 and configured for gripping the first subcomponent 16. The component assembly system 14 also further includes the second robot arm 130, the second subcomponent 18 defining the second plurality of locating holes 128 (FIG. 7), and the second end-of-arm tool 126 attached to the second robot arm 130 and configured for grasping the second subcomponent 18.

Figure 11:
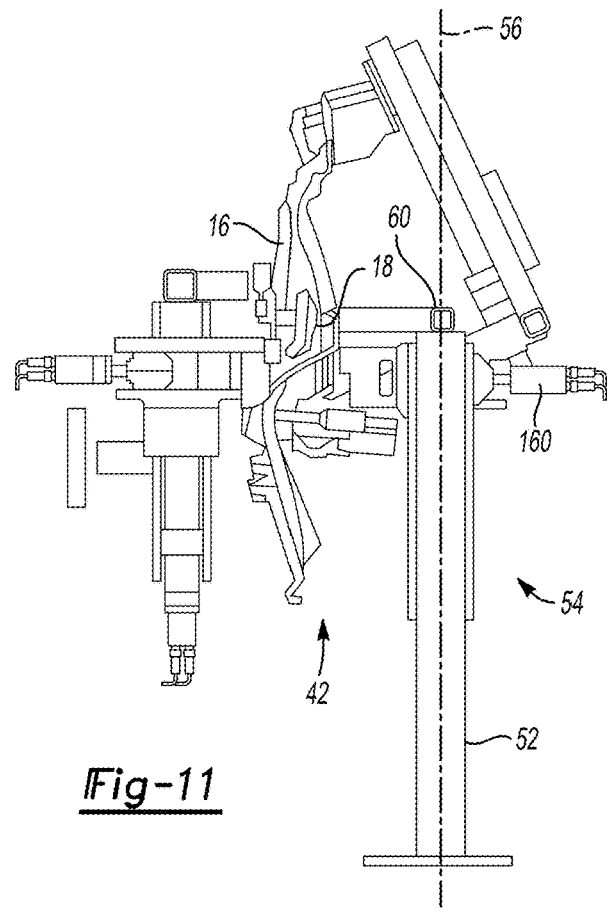
FIG. 11 is a schematic illustration of a side view of a portion of the component assembly system of FIG. 2B.

With continued reference to FIGS. 2A and 2B, the second robot arm 130 is translatable towards the first robot arm 30. That is, the second robot arm 130 may move towards and away from the first robot arm 30 to translate the second subcomponent 18 relative to the first subcomponent 16 without releasing 110 (FIG. 1) the first subcomponent 16 from the first end-of-arm tool 26, and without releasing 110 the second subcomponent 18 from the second end-of-arm tool 126. More specifically, the second robot arm 130 is configured for aligning the first plurality of locating holes 28 (FIG. 6) adjacent to the second plurality of locating holes 128 (FIG. 7) to thereby set an initial position 42 (FIG. 11) of the second subcomponent 18 relative to the first subcomponent 16 without releasing 110 the second subcomponent 18, as set forth in more detail below. Similarly, the first robot arm 30 is configured for aligning the first plurality of locating holes 28 adjacent to the second plurality of locating holes 128 to thereby set the initial position 42 without releasing 110 the first subcomponent 16, as also set forth in more detail below.

Referring to FIGS. 2A and 2B, the component assembly system 14 also includes a joining robot arm 44 configured for forming a joint 46 (FIGS. 2A and 2B) between the first subcomponent 16 and the second subcomponent 18. The joining robot arm 44 includes a joining tool 48 configured for joining together two subcomponents 16, 18. For example, the joining robot arm 44 may be a welding robot arm configured for forming a weld between the first subcomponent 16 and the second subcomponent 18 and the joining tool 48 may be an arc welder. Alternatively, the joining robot arm 44 may be a crimping robot arm configured for forming a crimp between the first subcomponent 16 and the second subcomponent 18 and the joining tool 48 may be a set of rollers. Likewise, the joining robot arm 44 may be any other suitable robot arm such as an adhesive robot arm, a rivet robot arm, and the like, and the joining tool 48 may include any elements suitable for attaching the second subcomponent 18 to the first subcomponent 16. In one non-limiting example, the joining robot arm 44 is a six-axis articulated welding robot arm configured for welding together the first subcomponent 16 and the second subcomponent 18.

Referring now to FIGS. 2B and 3-5, the component assembly system 14 may further include a fixture 50 configured for supporting the first subcomponent 16. As set forth in more detail below, the fixture 50 may be configured for supporting the first subcomponent 16 without compromising a structure or integrity of the first subcomponent 16. That is, the fixture 50 may support the first subcomponent 16 during manufacturing operations regardless of whether the first subcomponent 16 defines existing attachment or locating holes, and may provide accurate alignment of the first subcomponent 16 with respect to the second subcomponent 18 during material handling and/or joining operations, e.g., during welding operations.

Figure 5:
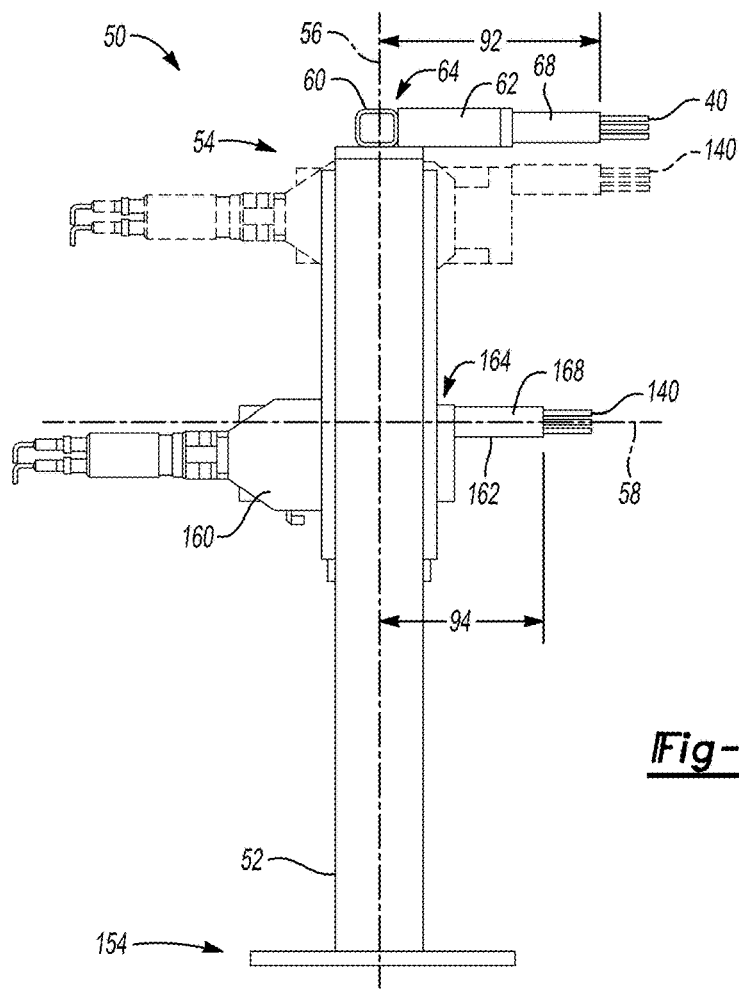
FIG. 5 is a schematic illustration of a side view of the fixture of FIG. 3.

As best shown in FIG. 2B, the fixture 50 may include a stand 52 spaced apart from the first robot arm 30 and the second robot arm 130. For example, the stand 52 may be disposed at a midpoint or other location between the first robot arm 30 and the second robot arm 130. Referring now to FIG. 5, the stand 52 may have a first end 54 and a second end 154 spaced apart from the first end 54. Further, the stand 52 may have a longitudinal axis 56 extending between the first end 54 and the second end 154. In addition, the stand 52 may also have a latitudinal axis 58 disposed perpendicular to the longitudinal axis 56. The stand 52 may be configured for affixing to a floor or other surface, e.g., of a manufacturing facility, and may provide the first subcomponent 16 with a fixed support. As such, the stand 52 may be formed from a metal, plastic, or composite according to a desired rigidity and operating environment.

As described with continued reference to FIG. 5, the fixture 50 may also include a first arm 60 attached to the stand 52 at the first end 54. The first arm 60 may be, for example, a robotic arm, and may be stationary with respect to the second end 154. That is, the first arm 60 may be fixed to the first end 54 and may not traverse along the longitudinal axis 56 or latitudinal axis 58 during operation of the fixture 50.

Further, the fixture 50 may include a first end effector 62 attached to the first arm 60, e.g., at a distal end 64 of the first arm 60. The first end effector 62 may be configured for supporting the first subcomponent 16 during manufacturing operations, as set forth in more detail below. More specifically, the first end effector 62 may be configured for conforming to a shape of the first subcomponent 16 and thereby providing a support against which the first subcomponent 16 may rest.

Figure 4:
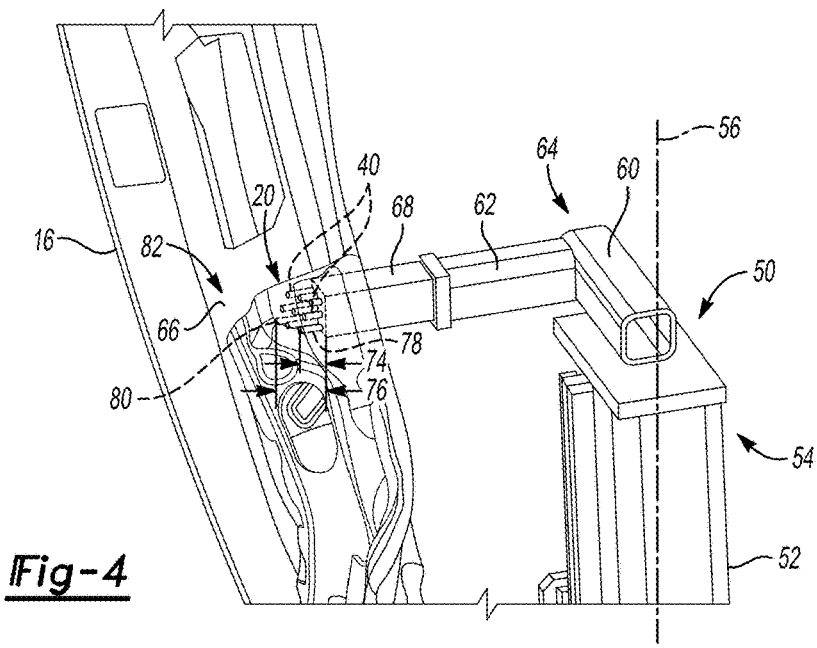
FIG. 4 is a schematic illustration of a partial, perspective view of a portion of the component assembly system of FIG. 2B.

For example, in one non-limiting embodiment described with reference to FIGS. 3 and 4, the first subcomponent 16 may have a first surface 66 having a first contour 20, and a second surface 166 adjacent the first surface 66 and having a second contour 22 that is different from the first contour 20. In one non-limiting embodiment, the first subcomponent 16 may be a decklid panel or liftgate panel for an automotive vehicle. Alternatively, the first subcomponent 16 may be a portion of an aircraft wing or a seat of an unassembled chair. The fixture 50 may accommodate various shapes and contours 20, 22 and may therefore provide for flexible manufacturing operations. That is, the fixture 50 may be used for manufacturing operations requiring consecutive first subcomponents 16 having differing sizes and/or shapes. Stated differently, one fixture 50 may accommodate and support any number of first subcomponents 16, regardless of whether the first subcomponents 16 are similarly-shaped or -sized.

Referring now to FIGS. 8-10, the first end effector 62 may have a first cap 68 defining a first plurality of channels 70 therein. That is, the first end effector 62 may define the first plurality of channels 70. Further, the first end effector 62 may include a first plurality of pins 40. The first plurality of pins 40 may be an element of the component assembly system 14 and may be arranged to support the first subcomponent 16 during manufacturing operations such as assembly, inspection, placement, and the like.

For example, as best shown in FIG. 10, the first plurality of pins 40 may include nine pins 40 arranged in three rows 72 of three pins 40. That is, the first cap 68 may have a square cross-section and the first plurality of pins 40 may be arranged in a square array of three rows 72 each having three pins 40. During operation of the fixture 50, the first plurality of pins 40 may each abut the first surface 66 of the first subcomponent 16.

More specifically, each of the first plurality of pins 40 may be retractable into and translatable out of a respective one of the first plurality of channels 70. In particular, each of the first plurality of pins 40 may be independently retractable into the respective one of the first plurality of channels 70 with respect to at least another one of the first plurality of pins 40. That is, each of the first plurality of pins 40 may separately retract into and translate out of the respective one of the first plurality of channels 70. As such, referring to FIG. 4, during operation, each of the first plurality of pins 40 may extend from the first cap 68 to a different distance 74, 76.

For example, a first one 78 of the first plurality of pins 40 may abut the first surface 66 and extend from the first cap 68 to a first distance 74, and a second one 80 of the first plurality of pins 40 may abut the first surface 66 and extend from the first cap 68 to a second distance 76 that is greater than the first distance 74. Further, each of the first plurality of pins 40 may be independently actuatable to the support position (shown generally at 82 in FIG. 4) in which the pin 40 contacts the first subcomponent 16. Therefore, the first plurality of pins 40 may each separately actuate, i.e., extend from or retract into the respective one of the first plurality of channels 70, to conform to a shape of the first subcomponent 16 and support an exact contour 20, 22 (FIG. 3) of the first subcomponent 16.

Referring again to FIGS. 8 and 9, the first cap 68 may house a first actuation system 84 configured for translating the first plurality of pins 40 into and out of the first plurality of channels 70. The first actuation system 84 may receive an actuation signal (not shown) such as an electronic or thermal activation signal and may mechanically actuate the first plurality of pins 40. In one non-limiting embodiment, the first cap 68 may define a plurality of orifices, e.g., a first inlet 86 and a first outlet 88, each configured for receiving an actuation fluid, e.g., air, water, or oil. The first actuation system 84 may further include a plurality of seals 90 configured to maintain pneumatic pressure within the first cap 68. In one example, air may independently actuate each of the first plurality of pins 40 from a first position in which the first plurality of pins 40 are retracted within the first plurality of channels 70 to the support position 82 (FIG. 4) in which each of the first plurality of pins 40 is extended to abut the first subcomponent 16 according to a shape or contour 20, 22 of the first subcomponent 16. It is to be appreciated that the support position 82 for one of the first plurality of pins 40 may correspond to the first distance 74 (FIG. 4) while the support position 82 for another one of the first plurality of pins 40 may correspond to the second distance 76 (FIG. 4). That is, the support position 82 for any given pin 40 may be determined by the contour 20, 22 of the first subcomponent 16.

As a non-limiting example, during operation, the first plurality of pins 40 may be initially retracted into the first plurality of channels 70 in preparation for receiving the first subcomponent 16. Next, the first subcomponent 16 may be spaced opposite the first plurality of pins 40. Air may then enter the first inlet 86 at a controlled flow rate so that each of the first plurality of pins 40 extends from the respective one of the first plurality of channels 70 towards the first subcomponent 16 at an equal distance. Then, the first subcomponent 16 may translate towards the first cap 68 and eventually abut the first plurality of pins 40. Once each of the first plurality of pins 40 abuts or touches the first surface 66 of the first subcomponent 16, one or more of the first plurality of pins 40 may retract into the respective ones of the first plurality of channels 70 slightly to thereby adjust to the contour 20, 22 of the first subcomponent 16 and adequately support the first subcomponent 16 with a controlled force during the manufacturing operation, e.g., welding. Importantly, if the first subcomponent 16 were to be removed at this stage, the first plurality of pins 40 would once again extend from the first cap 68 to the equal distance. After the manufacturing operation is complete, the first subcomponent 16 may translate away from the first cap 68 such that the first plurality of pins 40 no longer abut the first subcomponent 16, and the air may exhaust from the first cap 68 through the first outlet 88 so that the first plurality of pins 40 retract into the first plurality of channels 70. Then, the next consecutive first subcomponent 16 of the manufacturing operation is ready to translate to a position opposite the first arm 60 so that the fixture 50 is again ready to receive the next consecutive first subcomponent 16.

Referring again to FIG. 5, the fixture 50 may also include a second arm 160 attached to the stand 52 between the first end 54 and the second end 154. The second arm 160 may be, for example, a robotic arm, and may be translatable along the stand 52 with respect to the first arm 60 along the longitudinal axis 56. That is, the second arm 160 may translate towards and away from the first end 54 and may traverse along the longitudinal axis 56 and/or the latitudinal axis 58 during operation of the fixture 50. More specifically, the fixture 50 may include a track (not shown) upon which the second arm 160 travels along the longitudinal axis 56 and/or the latitudinal axis 58. Therefore, in contrast to the first arm 60 which may be stationary with respect to the stand 52, the second arm 160 may be translatable along both of the longitudinal axis 56 and the latitudinal axis 58.

Further, the fixture 50 may include a second end effector 162 attached to the second arm 160, e.g., at a distal end 164 of the second arm 160. The second end effector 162 may also be configured for supporting the first subcomponent 16 during manufacturing operations, as set forth in more detail below. More specifically, the second end effector 162 may also be configured for conforming to a shape of the first subcomponent 16 and thereby providing a support against which the first subcomponent 16 may rest.

Referring now to FIGS. 8-10, the second end effector 162 may have a second cap 168 defining a second plurality of channels 170 therein. That is, the second end effector 162 may define the second plurality of channels 170. Since the second arm 160 may translate along the latitudinal axis 58 (FIG. 5) while the first arm 60 is stationary with respect to the stand 52 along the latitudinal axis 58, the first cap 68 may be spaced apart from the longitudinal axis 56 to a fixed distance 92. However, the second cap 168 may be spaced apart from the longitudinal axis 56 along the latitudinal axis 58 to a support distance 94. The support distance 94 may be less than the fixed distance 92. Alternatively, the support distance 94 may be greater than or equal to the fixed distance 92. Therefore, the fixture 50 and component assembly system 14 may be customizable for first subcomponents 16 of various sizes and shapes and may enable flexible and cost-effective manufacturing.

Further, the second end effector 162 may include a second plurality of pins 140. The second plurality of pins 140 may be an element of the component assembly system 14 and may be arranged to support the first subcomponent 16 during manufacturing operations such as assembly, inspection, placement, and the like.

For example, as best shown in FIG. 10, the second plurality of pins 140 may include nine pins 140 arranged in three rows 72 of three pins 140. That is, the second cap 168 may have a square cross-section and the second plurality of pins 140 may be arranged in a square array of three rows 72 each having three pins 140. During operation of the fixture 50, the second plurality of pins 140 may each abut the second surface 166 of the first subcomponent 16.

More specifically, each of the second plurality of pins 140 may be retractable into and translatable out of a respective one of the second plurality of channels 170. In particular, each of the second plurality of pins 140 may be independently retractable into the respective one of the second plurality of channels 170 with respect to at least another one of the second plurality of pins 140. That is, each of the second plurality of pins 140 may separately retract into and translate out of the respective one of the second plurality of channels 170. As such, each of the second plurality of pins 140 may extend from the second cap 168 to a different distance 174, 176.

For example, as best shown in FIG. 3, a first one 178 of the second plurality of pins 140 may abut the second surface 166 and extend from the second cap 168 to a third distance 174, and a second one 180 of the second plurality of pins 140 may abut the second surface 166 and extend from the second cap 168 to a fourth distance 176 that is greater than the third distance 174. Further, each of the second plurality of pins 140 may be actuatable to the support position (shown generally at 82 in FIG. 4) in which the pin 140 contacts the first subcomponent 16. Therefore, the second plurality of pins 140 may each separately actuate, i.e., extend from or retract into the respective one of the second plurality of channels 170, to conform to a shape of the first subcomponent 16 and support an exact contour 20, 22 of the first subcomponent 16.

Referring again to FIGS. 8 and 9, the second cap 168 may also house a second actuation system 184 configured for translating the second plurality of pins 140 into and out of the second plurality of channels 170. The second actuation system 184 may receive an actuation signal (not shown) such as an electronic or thermal activation signal and may mechanically actuate the second plurality of pins 140. In one non-limiting embodiment, the second cap 168 may define a plurality of orifices, e.g., a second inlet 186 and a second outlet 188 each configured for receiving an actuation fluid, e.g., air, water, or oil. The second actuation system 184 may further include a plurality of seals 90 configured to maintain pneumatic pressure within the second cap 168. In one example, air may individually actuate each of the second plurality of pins 140 from a first position in which the second plurality of pins 140 are retracted within the second plurality of channels 170 to the support position 82 (FIG. 4) in which each of the second plurality of pins 140 is extended to abut the first subcomponent 16 according to a shape or contour 20, 22 of the first subcomponent 16. It is to be appreciated that the support position 82 for one of the second plurality of pins 140 may correspond to the third distance 174 while the support position 82 for another one of the second plurality of pins 140 may correspond to the fourth distance 176. That is, the support position 82 for any given pin 140 may be determined by the contour 20, 22 of the first subcomponent 16.

As a non-limiting example, during operation, the second plurality of pins 140 may be initially retracted into the second plurality of channels 170 in preparation for receiving the first subcomponent 16. Next, the first subcomponent 16 may be spaced opposite the second plurality of pins 140. Air may then enter the second inlet 186 at a controlled flow rate so that each of the second plurality of pins 140 extends from the respective one of the second plurality of channels 170 towards the first subcomponent 16 at an equal distance. Then, the first subcomponent 16 may translate towards the second cap 168 and eventually abut the second plurality of pins 140. Once each of the second plurality of pins 140 abuts or touches the surface 66, 166 of the first subcomponent 16, one or more of the second plurality of pins 140 may retract into the respective ones of the second plurality of channels 170 slightly to thereby adjust to the contour 20, 22 of the first subcomponent 16 and adequately support the first subcomponent 16 with a controlled force during the manufacturing operation, e.g., welding. Importantly, if the first subcomponent 16 were to be removed at this stage, the second plurality of pins 140 would once again extend from the second cap 168 to the equal distance. After the manufacturing operation is complete, the first subcomponent 16 may translate away from the second cap 168 such that the second plurality of pins 140 no longer abut the first subcomponent 16, and the air may exhaust from the second cap 168 through the second outlet 188 so that the second plurality of pins 140 retract into the second plurality of channels 170. Then, the next consecutive first subcomponent 16 of the manufacturing operation is ready to translate to a position opposite the second arm 160 so that the fixture 50 is again ready to receive the next consecutive first subcomponent 16.

Further, it is to be appreciated that the fixture 50 and component assembly system 14 may include more than two end effectors 62, 162 and more than two pluralities of pins 40, 140. For example, the fixture 50 and component assembly system 14 may include three, four, or five or more end effectors 62, 162 and three, four, five, or more pluralities of pins 40, 140. Therefore, the fixture 50 and component assembly system 14 may include more than two arms 60, 160, e.g., three, four, five, or more arms 60, 160. Further, more than one of the arms 60, 160 may translate along both the longitudinal axis 56 and latitudinal axis 58 during operation. As such, the fixture 50 and component assembly system 14 may provide customized and precise positioning and placement of subcomponents 16, 18.

Therefore, the fixture 50 and component assembly system 14 may be especially suitable for manufacturing operations which transform variously-sized first subcomponents 16. That is, the fixture 50 and component assembly system 14 may provide a shape-conforming flexible tool that transmits a controlled supporting force to the first subcomponent 16. Further, since some first subcomponents 16 may be too wide for a two-sided clamp, the fixture 50 may provide for one-sided support during manufacturing operations.

Referring again to FIG. 1, as set forth above, the method 10 may also include, after gripping 24, positioning 38 the first plurality of pins 40 in alignment with the first plurality of locating holes 28. Similarly, the method 10 may include disposing 96 the second plurality of pins 140 in alignment with the second plurality of locating holes 128. That is, for the method 10, the first robot arm 30 may pick up and grip the first subcomponent 16, and then may translate the first subcomponent 16 towards the fixture 50 so that the first plurality of locating holes 28 are aligned with the first plurality of pins 40 and the second plurality of locating holes 128 are aligned with the second plurality of pins 140.

Concurrent to positioning 38 and disposing 96, the method 10 may further include retracting 98 each of the first plurality of pins 40 into the respective one of the first plurality of channels 70 and retracting 98 each of the second plurality of pins 140 into the respective one of the second plurality of channels 170. That is, each of the first plurality of pins 40 and each of the second plurality of pins 140 may be retracted into the respective one of the first plurality of channels 70 and the second plurality of channels 170 so that the pins 40, 140 do not contact or push against the first subcomponent 16. Rather, the pins 40, 140 are aligned with the first plurality of locating holes 28 and the second plurality of locating holes 128 such that the pins 40, 140 are ready to translate out of the respective one of the plurality of channels 70, 170.

Next, or concurrent to positioning 38 and disposing 96, the second robot arm 130 may pick up or grasp the second subcomponent 18 as set forth above. After grasping 36, the method 10 includes aligning 100 at least one of the first plurality of locating holes 28 adjacent to at least one of the second plurality of locating holes 128 to thereby set the initial position 42 (FIG. 11) of the second subcomponent 18 relative to the first subcomponent 16 without releasing 110 the first subcomponent 16 from the first end-of-arm tool 26 and without releasing 110 the second subcomponent 18 from the second end-of-arm tool 126. That is, the second robot arm 130 may place and align the second subcomponent 18 relative to the first subcomponent 16 by aligning 100 the second plurality of locating holes 128 with and adjacent to the first plurality of locating holes 28 in free space. The second robot arm 130 may place and align the second subcomponent 18 without releasing 110 or letting go of the second subcomponent 18 into, for example, a tooling or part locating fixture (not shown). Similarly, the first robot arm 30 may place and align the first subcomponent 16 relative to the second subcomponent 18 by aligning 100 the first plurality of locating holes 28 with and adjacent to the second plurality of locating holes 128 in free space, i.e., without releasing 110 the first subcomponent 16 into, for example, another tooling or part locating fixture (not shown).

In one embodiment, the first robot arm 30 and/or the second robot arm 130 may be equipped with a visual detection system (not shown) configured for reading the position of objects. Therefore, the second robot arm 130 may visually scan the first subcomponent 16 to find the first plurality of locating holes 28 and then align the second plurality of locating holes 128 defined by the second subcomponent 18 with the first plurality of locating holes 28. The second robot arm 130 may also be configured to relocate or realign the second subcomponent 18 with respect to the first subcomponent 16, as set forth in more detail below.

Referring again to FIGS. 1, 2A, and 2B, the method 10 also includes, after aligning 100, forming 102 the joint 46 (FIGS. 2A and 2B) between the first subcomponent 16 and the second subcomponent 18 with the joining tool 48 attached to the joining robot arm 44 to thereby assemble the component 12. For example, forming 102 may include welding the second subcomponent 18 to the first subcomponent 16 to form a weld joint between the first and second subcomponents 16, 18. Alternatively, forming 102 may include crimping or adhering together the first subcomponent 16 and the second subcomponent 18 to form a crimped joint or an adhered joint, respectively.

However, before forming 102, the method 10 may also include relocating 104 the second subcomponent 18 with respect to the first subcomponent 16 to thereby adjust the initial position 42 (FIG. 11) to a final position 106 (FIG. 2A). That is, the second robot arm 130 may be configured to recognize an improper alignment between the first plurality of locating holes 28 and the second plurality of locating holes 128, and therefore translate the second subcomponent 18 slightly to adjust the second subcomponent 18 to the final position 106. For example, the second robot arm 130 may apply any necessary shim adjustments to the second subcomponent 18 according to a comparison between the initial position 42 (FIG. 11) and the desired final position 106. Importantly, the second robot arm 130 may relocate the second subcomponent 18 in free space, i.e., without the aid of the fixture 50 and/or the first plurality of pins 40 and the second plurality of pins 140.

Conversely, the first robot arm 30 may be configured to recognize an improper alignment between the first plurality of locating holes 28 and the second plurality of locating holes 128, and therefore translate the first subcomponent 16 to adjust the first subcomponent 16 to the final position 106 (FIG. 2A). That is, the first robot arm 30 may apply any necessary shim adjustments to the first subcomponent 16 according to a comparison between the initial position 42 (FIG. 11) and the desired final position 106. Importantly, the first robot arm 30 may relocate the first subcomponent 16 in free space, i.e., without the aid of the fixture 50 and/or the first plurality of pins 40 and the second plurality of pins 140.

Alternatively or additionally, both the first robot arm 30 and the second robot arm 130 may cooperate to identify and recognize an improper alignment between the first plurality of locating holes 28 and the second plurality of locating holes 128, and both of the first robot arm 30 and the second robot arm 130 may translate the first subcomponent 16 and the second subcomponent 18, respectively, to adjust both the first subcomponent 16 and the second subcomponent 18 to the final position 106 with respect to each other. That is, the first robot arm 30 may relocate the first subcomponent 16 in free space, i.e., without the aid of the fixture 50 and/or the first plurality of pins 40 and the second plurality of pins 140, while the second robot arm 130 also relocates the second subcomponent 18 in free space. As such, the component assembly system 14 enables robot-to-robot alignment of subcomponents 16, 18 without the need for physical tooling configured for supporting each subcomponent 16, 18. Therefore, the method 10 and component assembly system 14 may save manufacturing facility floor space and may enable compact manufacturing equipment layout.

Next, the method 10 may include, after positioning 38 and disposing 96, translating 108 each of the first plurality of pins 40 out of the respective one of the first plurality of channels 70 and translating 108 each of the second plurality of pins 140 out of the respective one of the second plurality of channels 170 such that each of the first plurality of pins 40 and each of the second plurality of pins 140 contacts the first subcomponent 16 so that the fixture 50 and the second robot arm 130 clamp together the first subcomponent 16 and the second subcomponent 18.

That is, the first plurality of pins 40 may extend from the first plurality of channels 70 and contact the first surface 66, and the second plurality of pins 140 may extend from the second plurality of channels 170 and contact the second surface 166 to thereby press against and support the first subcomponent 16 as the second robot arm 130 presses the second subcomponent 18 against the first subcomponent 16. Such translating 108 may hold and secure the relative position of the first and second subcomponents 16, 18. That is, the fixture 50 may serve as a backstop or support and provide for one-sided joining of the first and second subcomponents 16, 18. Stated differently, the joining robot arm 44 may form the joint 46 (FIG. 2B) between the first and second subcomponents 16, 18 without holding the subcomponents 16, 18 together. Rather, the joining robot arm 44 may slide into position, apply a welding energy, and quickly join the first and second subcomponents 16, 18 together without having to first clamp the two subcomponents 16, 18 together. As such, a speed of assembly, throughput, and manufacturing flexibility may be increased and manufacturing costs and downtime may be decreased.

Referring again to FIG. 1, the method 10 may also include, after forming 102, releasing 110 the second subcomponent 18 from the second end-of-arm tool 126 and grasping 36 another second subcomponent 18 with the second end-of-arm tool 126. That is, once the joining robot arm 44 forms the joint 46 between the first and second subcomponents 16, 18, e.g., forms one weld between the two subcomponents 16, 18, the second subcomponent 18 is initially attached to the first subcomponent 16 and does not require any additional clamping or support. Therefore, the joining robot arm 44 may continue to form additional joints 46 between the first and second subcomponents 16, 18 while the second robot arm 130 grasps another second subcomponent 18 with the second end-of-arm tool 126. Such releasing 110 may therefore also increase speed of assembly and throughput of the manufacturing operations.

Therefore, the method 10 and component assembly system 14 may be especially suitable for manufacturing operations which consecutively transform variously-sized and -shaped components 12. More specifically, the method 10 and component assembly system 14 provide a shape-conforming, flexible tool that transmits a controlled supporting force to the component 12 during manufacturing operations. The method 10 and component assembly system 14 may be especially suitable for components 12 having complex shapes or contours 20, 22 (FIG. 3). For example, the method 10 and component assembly system 14 may enable flexible manufacturing processes which can accommodate variously-sized and -shaped decklids and liftgates without requiring a change in tooling, which may be especially helpful during a model changeover. That is, the component assembly system 14 may simply be electronically reprogrammed rather than physically retooled during a model changeover. Therefore, the component assembly system 14 enables only modifications to software rather than modifications to hardware when a size or shape of the component 12 changes.

In addition, the method 10 and component assembly system 14 may be suitable for manufacturing operations and environments requiring accurate part location and placement since the method 10 may include aligning 100 and relocating 104 the first and second subcomponents 16, 18. Further, since some components 12 may be too wide or too contoured for a two-sided clamp, the method 10 and component assembly system 14 provide for one-sided support during manufacturing operations.

While the best modes for carrying out the disclosure have been described in detail, those familiar with the art to which this disclosure relates will recognize various alternative designs and embodiments for practicing the disclosure within the scope of the appended claims.

The invention claimed is:

1. A component assembly system comprising:
a first robot arm;
a first subcomponent defining a first plurality of locating holes;
a first end-of-arm tool attached to the first robot arm and configured for gripping the first subcomponent;
a second robot arm translatable towards the first robot arm;
a second subcomponent defining a second plurality of locating holes;
a second end-of-arm tool attached to the second robot arm and configured for grasping the second subcomponent;
wherein the second robot arm is configured for aligning the first plurality of locating holes adjacent to the second plurality of locating holes to thereby set an initial position of the second subcomponent relative to the first subcomponent without releasing the second subcomponent from the second end-of-arm tool;
wherein the first robot arm is configured for aligning the first plurality of locating holes adjacent to the second plurality of locating holes to thereby set the initial position without releasing the first subcomponent from the first end-of-arm tool;
a joining robot arm configured for forming a joint between the first subcomponent and the second subcomponent; and
a fixture configured for supporting the first subcomponent, the fixture including:
a stand spaced apart from the first robot arm and the second robot arm and having:
a first end;
a second end spaced apart from the first end; and
a longitudinal axis extending between the first end and the second end;
a first arm attached to the stand at the first end, wherein the first arm is stationary with respect to the second end;
a first end effector attached to the first arm and having:
a first cap defining a first plurality of channels therein; and
a first plurality of pins, wherein each of the first plurality of pins is retractable into and translatable out of a respective one of the first plurality of channels;
wherein each of the first plurality of pins is initially retracted into the respective one of the first plurality of channels so as not to extend from the respective one of the first plurality of channels in preparation for receiving the first subcomponent when the first subcomponent is spaced opposite the first plurality of pins;
a second arm attached to the stand between the first end and the second end, wherein the second arm is translatable along the stand with respect to the first arm along the longitudinal axis; and
a second end effector attached to the second arm and having:
a second cap defining a second plurality of channels therein; and
a second plurality of pins, wherein each of the second plurality of pins is retractable into and translatable out of a respective one of the second plurality of channels;
wherein each of the second plurality of pins is initially retracted into the respective one of the second plurality of channels so as not to extend from the respective one of the second plurality of channels in preparation for receiving the first subcomponent when the first subcomponent is spaced opposite the second plurality of pins.

2. The component assembly system of claim 1, wherein the stand further has a latitudinal axis disposed perpendicular to the longitudinal axis, and further wherein the second arm is translatable along the latitudinal axis.

3. The component assembly system of claim 1, wherein each of the first plurality of pins is independently retractable into the respective one of the first plurality of channels with respect to at least another one of the first plurality of pins.

4. The component assembly system of claim 3, wherein each of the second plurality of pins is independently translatable out of the respective one of the second plurality of channels with respect to at least another one of the second plurality of pins.

5. The component assembly system of claim 1, wherein a first one of the first plurality of pins extends from the first cap to a first distance and a second one of the first plurality of pins extends from the first cap to a second distance that is greater than the first distance.

6. The component assembly system of claim 1, wherein a first one of the second plurality of pins extends from the second cap to a third distance and a second one of the second plurality of pins extends from the second cap to a fourth distance that is greater than the third distance.

7. The component assembly system of claim 1, wherein the first plurality of pins includes nine pins arranged in three rows of three pins and the second plurality of pins includes nine pins arranged in three rows of three pins.

8. A component assembly system comprising:
a first robot arm;
a first subcomponent defining a first plurality of locating holes, wherein the first subcomponent has a first surface having a first contour;
a first end-of-arm tool attached to the first robot arm and configured for gripping the first subcomponent;
a second robot arm translatable towards the first robot arm;
a second subcomponent defining a second plurality of locating holes, wherein the second subcomponent has a second surface adjoining the first surface and having a second contour that is different from the first contour;
a second end-of-arm tool attached to the second robot arm and configured for grasping the second subcomponent;
wherein the second robot arm is configured for aligning the first plurality of locating holes adjacent to the second plurality of locating holes to thereby set an initial position of the second subcomponent relative to the first subcomponent without releasing the second subcomponent from the second end-of-arm tool;
wherein the first robot arm is configured for aligning the first plurality of locating holes adjacent to the second plurality of locating holes to thereby set the initial position without releasing the first subcomponent from the first end-of-arm tool; and
a fixture configured for supporting the first subcomponent and including:
a stand spaced apart from the first robot arm and the second robot arm and having:
a first end;
a second end spaced apart from the first end; and
a longitudinal axis extending between the first end and the second end;
a first arm attached to the stand at the first end, wherein the first arm is stationary with respect to the second end;
a first end effector attached to the first arm and having:
a first cap defining:
a first plurality of channels therein;
a first inlet configured for receiving air; and
a first outlet spaced apart from the first inlet and configured for receiving air; and
a first plurality of pins each abutting the first surface, wherein each of the first plurality of pins is retractable into and translatable out of a respective one of the first plurality of channels;
wherein each of the first plurality of pins is initially retracted into the respective one of the first plurality of channels so as not to extend from the respective one of the first plurality of channels in preparation for receiving the first subcomponent when the first subcomponent is spaced opposite the first plurality of pins;
wherein the first plurality of pins is actuatable by air from a first position in which the first plurality of pins are retracted within the first plurality of channels to a support position in which the first plurality of pins are extended to abut the first subcomponent according to the first contour;
a second arm attached to the stand between the first end and the second end, wherein the second arm is translatable along the stand with respect to the first arm along the longitudinal axis; and
a second end effector attached to the second arm and having:
a second cap defining:
a second plurality of channels therein;
a second inlet configured for receiving air; and
a second outlet spaced apart from the second inlet and configured for receiving air; and
a second plurality of pins each abutting the second surface, wherein each of the second plurality of pins is retractable into and translatable out of a respective one of the second plurality of channels;
wherein each of the second plurality of pins is initially retracted into the respective one of the second plurality of channels so as not to extend from the respective one of the second plurality of channels in preparation for receiving the first subcomponent when the first subcomponent is spaced opposite the second plurality of pins;
wherein the second plurality of pins is actuatable by air from the first position in which the second plurality of pins are retracted within the second plurality of channels to the support position in which the second plurality of pins are extended to abut the first subcomponent according to the first contour; and
a joining robot arm configured for forming a joint between the first subcomponent and the second subcomponent.

9. The component assembly system of claim 8, wherein the stand further has a latitudinal axis disposed perpendicular to the longitudinal axis, and further wherein the second arm is translatable along the latitudinal axis.

10. The component assembly system of claim 9, wherein the first cap is spaced apart from the longitudinal axis to a fixed distance, and further wherein the second cap is spaced apart from the longitudinal axis along the latitudinal axis to a support distance.

11. The component assembly system of claim 10, wherein a first one of the first plurality of pins abuts the first surface and extends from the first cap to a first distance, and further wherein a second one of the first plurality of pins abuts the first surface and extends from the first cap to a second distance that is greater than the first distance.

12. The component assembly system of claim 10, wherein a first one of the second plurality of pins abuts the second surface and extends from the second cap to a third distance, and further wherein a second one of the second plurality of pins abuts the second surface and extends from the second cap to a fourth distance that is greater than the third distance.

* * * * *